(12) United States Patent
Morita

(10) Patent No.: US 12,271,642 B2
(45) Date of Patent: Apr. 8, 2025

(54) INFORMATION PROCESSING APPARATUS, METHOD FOR CONTROLLING INFORMATION PROCESSING APPARATUS, AND STORAGE MEDIUM FOR DISPLAYING A SCREEN PROVIDED BY A PRINT SETTING APPLICATION

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/317,787

(22) Filed: May 15, 2023

(65) Prior Publication Data
US 2023/0289115 A1 Sep. 14, 2023

Related U.S. Application Data

(63) Continuation of application No. 17/861,836, filed on Jul. 11, 2022, now Pat. No. 11,687,297, which is a
(Continued)

(30) Foreign Application Priority Data

Jun. 29, 2018 (JP) ................................. 2018-124000

(51) Int. Cl.
G06F 3/12 (2006.01)
H04N 1/00 (2006.01)

(52) U.S. Cl.
CPC .......... *G06F 3/1232* (2013.01); *G06F 3/1203* (2013.01); *G06F 3/1253* (2013.01);
(Continued)

(58) Field of Classification Search
None
See application file for complete search history.

(56) References Cited

U.S. PATENT DOCUMENTS

2001/0032185 A1* 10/2001 Masaki .................. G06Q 30/04
705/52
2011/0199640 A1* 8/2011 Shirai ................... G06F 3/1257
358/1.15
(Continued)

FOREIGN PATENT DOCUMENTS

JP 2016126444 A 7/2016
JP 2017159523 A 9/2017

*Primary Examiner* — Miya J Cato
(74) *Attorney, Agent, or Firm* — Canon U.S.A., Inc. IP Division

(57) ABSTRACT

According to some embodiments, a printer capability acquiring unit of a general-purpose printer driver acquires, from a printer, definition information (definition for acquisition of apparatus-specific definition) for information acquisition specific to the printer, using definition information for information acquisition (definition for acquisition of apparatus-common information) commonly usable for various printers and independent of vendors or models, acquires, from the printer, configuration information specific to the printer, using the definition for acquisition of apparatus-specific information, and saves the configuration information in an extended information storage unit for each printer. The general-purpose printer driver controls the printer using the configuration information for the printer saved in the extended information storage unit.

24 Claims, 11 Drawing Sheets

Related U.S. Application Data continuation of application No. 17/380,679, filed on Jul. 20, 2021, now Pat. No. 11,422,758, which is a continuation of application No. 16/452,190, filed on Jun. 25, 2019, now Pat. No. 11,093,185.

(52) U.S. Cl.
CPC .......... *G06F 3/1254* (2013.01); *G06F 3/1256* (2013.01); *G06F 3/1285* (2013.01); *H04N 1/00244* (2013.01); *G06F 3/1227* (2013.01)

(56) References Cited

U.S. PATENT DOCUMENTS

| | | | |
|---|---|---|---|
| 2013/0201517 A1* | 8/2013 | Blanchard, Jr. ....... | G06F 3/1205 358/1.15 |
| 2015/0172484 A1* | 6/2015 | Kanno .................. | G06F 3/1232 358/1.13 |
| 2015/0286451 A1* | 10/2015 | Armstrong ............ | G06F 3/1205 358/1.15 |
| 2016/0269576 A1* | 9/2016 | Norota .................. | G06F 3/1232 |

* cited by examiner

FIG. 5A

INFORMATION ACQUISITION  501

DOCUMENT SIZE    A4
NUMBER OF COPIES    1

PAGE AGGREGATION ▮
DOUBLE SIDED PRINTING ▮
COLOR MODE [ COLOR ▽ ]

INFORMATION ACQUISITION  501

DOCUMENT SIZE    A4
NUMBER OF COPIES    1

PAGE AGGREGATION ▮
DOUBLE SIDED PRINTING ▮
COLOR MODE [ COLOR ▽ ]
STAPLE [ UPPER LEFT ▽ ]
NEEDLE-LESS BINDING ▮
PUNCHING ▮

```
<?xml version="1.0"?>
<Definition>
  <Schema xmlns:vn="http://www.vendor.com/ns/active/wsd" xmlns:nprt="http://schemas.microsoft.com/windows/2006/08/wdp/print">
    <Property name="vendor">
      <Property name="Device">
        <Property name="Capability">
          <Parameter name="CapabilityDefinition" query="vn:CapabilityDefinition">
            <Value name="Name" query="vn:CapabilityDefinition" type="STRING" />
          </Parameter>
        </Property>
      </Property>
    </Property>
  </Property>
  </Property>
  </Schema>
</Definition>
```

```
/// <reference path="PrintDriver-Intellisense.js" />
/// <reference path="PrintDriver-Intellisense-WindowsXX.js" />
////////////////////////////////////////////////////
// Public Method (Usb port monitor calls these functions) //
////////////////////////////////////////////////////
function startPrintJob(usbJobContext, printerStream, printerBidiSchemaResponses) {
  ...
} function writePrintData(usbJobContext, printData, printerStream, writePrintDataProgress, printerBidiSchemaResponses) {
  ...
} function endPrintJob(usbJobContext, printerStream, printerBidiSchemaResponses) {
  ...
} function getSchemas(driverProperties, printerStream, schemaRequests, printerBidiSchemaResponses) {
  ...
} function setSchema(driverProperties, printerStream, printerBidiSchemaElement) {
  ...
} function getStatus(driverProperties, printerStream, printerBidiSchemaResponses) {
  ...
}
```

FIG. 9

```xml
<?xml version="1.0"?>
<Definition>
  <Schema xmlns:vn="http://www.vendor.com/ns/active/wsd" xmlns:nprt="http://schemas.microsoft.com/windows/2006/08/wdp/print">
    <Property name="Printer">
      <Property name="Finishing">
        <Property name="Staple">
          <Installed name="Installed" query="vn:Printer" drvPrinterEvent="true" />
        </Property>
      </Property>
      <Property name="vendor">
        <Property name="Device">
          <Property name="FinishingCapacity">
            <Property name="Punching">
              <Property name="2Holes">
                <Installed name="Installed" drvPrinterEvent="true" query="vn:Printer" />
              </Property>
            </Property>
          </Property>
        </Property>
        <Property name="Capability">
          <Property name="StaplelessStitchingSupported">
            <Installed name="Supported" drvPrinterEvent="true" query="vn:Printer" />
          </Property>
        </Property>
      </Property>
      ...
  </Schema>
</Definition>
```

901 (upper dashed box)
902 (lower dashed box)

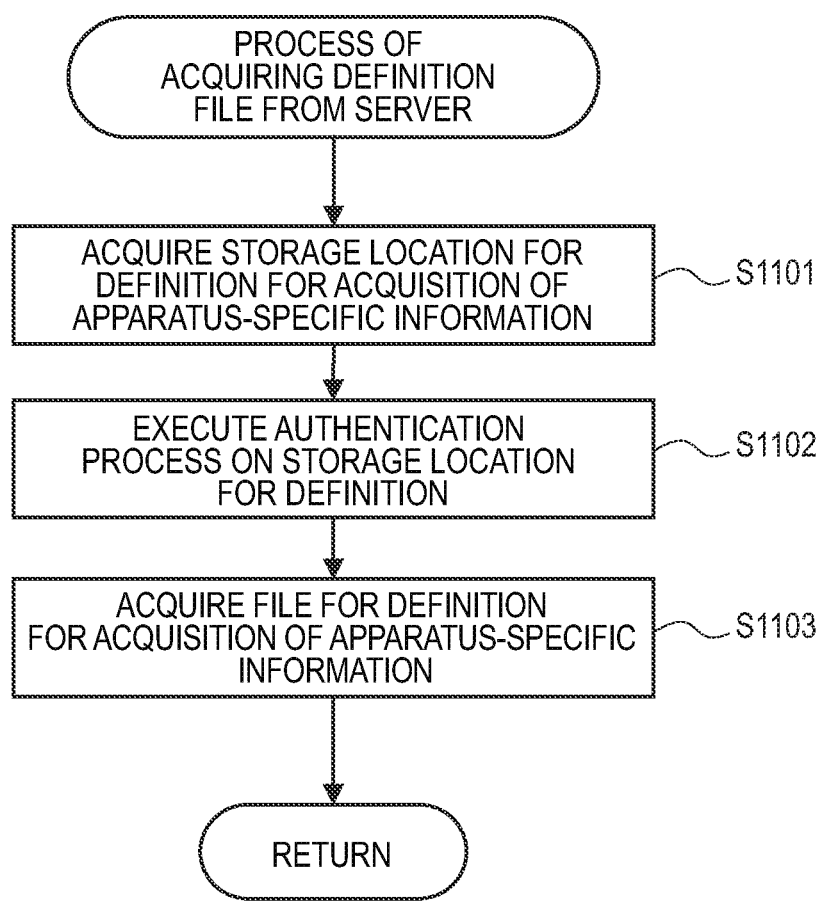

INFORMATION PROCESSING APPARATUS, METHOD FOR CONTROLLING INFORMATION PROCESSING APPARATUS, AND STORAGE MEDIUM FOR DISPLAYING A SCREEN PROVIDED BY A PRINT SETTING APPLICATION

CROSS-REFERENCE TO RELATED APPLICATIONS

This application is a Continuation of U.S. patent application Ser. No. 17/861,836, filed Jul. 11, 2022, which is a Continuation of U.S. patent application Ser. No. 17/380,679, filed Jul. 20, 2021, now U.S. Pat. No. 11,422,758, which is a Continuation of U.S. patent application Ser. No. 16/452,190, filed Jun. 25, 2019, now U.S. Pat. No. 11,093,185, which claims the benefit of Japanese Patent Application No. 2018-124000, filed Jun. 29, 2018, all of which are hereby incorporated by reference herein in their entirety.

BACKGROUND

Field of the Disclosure

The present disclosure relates to control of processing of acquiring information from a peripheral apparatus such as a printing apparatus.

Description of the Related Art

In recent years, environments have emerged in which users do not stay in particular places: mobile information processing terminals are used, and some companies adopt, for example, a non-territorial operational environment in which employees are not seated in particular places during work. Correspondingly, in more and more cases, users desire to perform printing using any of printing apparatus models from various vendors and various printing apparatus models according to the place where the user has moved, in addition to using a fixed printing apparatus as before.

Here, as a printer driver to control a plurality of types of printing apparatuses with different functions, a printer driver referred to as a universal printer driver is known (refer to, for example, Japanese Patent Application Laid-Open No. 2011-243067).

A technique has been designed that allows print data to be transmitted to a printing apparatus without using a printer driver provided by the vendor of the printing apparatus. For example, Ubuntu® 17.04 is equipped with a mechanism for transmitting print data to a printing apparatus compatible with IPP Everyware® as a default function of the OS. IPP Everyware is a series of standards enabling printing using printing apparatuses from various vendors and various brands, and industry associations and the like have been formulating and promoting standards for IPP Everyware.

In general, universal printer drivers as mentioned above are provided on a vendor-by-vendor basis. Accordingly, a single universal printer driver can be used to enable a plurality of types of printing apparatuses commercially available from the same vendor and having different functions. However, enabling printing apparatuses from different vendors by using a single universal printer driver has been difficult. This is because different vendors transmit and receive print data by using different communication methods, Page Description Language (PDL) or Job Description Language (JDL), and thus standardizing the printer drivers is difficult. Furthermore, each vendor uniquely extends the PDL or the JDL, and thus uniformly operating the printer drivers is difficult.

Convenience for users is assumed to be improved, even in an execution environment such as Windows®, by providing a mechanism for allowing printing to be performed without installation, on a case-by-case basis, of a V3 or V4 printer driver provided by the vendor.

Such a mechanism is expected to be achieved by allowing printing service using a mechanism compatible with the IPP to be utilized in the Windows environment (refer to, for example, the following URL: http://ug.oipsrv.net/USRMA-0672-zz-PS-jaJP/contents/PS850_network725_printernosetuzokuhouhouippipps.html).

Printing apparatuses commercially available from various vendors are enabled to perform printing by using a general-purpose printer driver independent of the vendor or model (hereinafter referred to as the "general-purpose printer driver"). However, conventional general-purpose printer drivers fail to enable apparatus-specific functions.

For example, in a case of acquiring configuration information (capability information) for a printing apparatus, the conventional general-purpose printer driver can acquire the information concerning general functions by a process of acquiring device configuration information compliant with the IPP. However, the conventional general-purpose printer driver fails to acquire information about apparatus-specific functions or new functions by the process of acquiring device configuration information compliant with the IPP.

SUMMARY

According to embodiments of the present disclosure, there is provided an information processing apparatus including a device driver commonly usable for a plurality of peripheral apparatuses, the information processing apparatus including a first acquisition unit acquiring second definition information that is definition information for information acquisition specific to any peripheral apparatus of the plurality of peripheral apparatuses, using first definition information that is definition information for information acquisition commonly usable for the plurality of peripheral apparatuses, a second acquisition unit acquiring, from the any peripheral apparatus, configuration information specific to the any peripheral apparatus, using the second definition information acquired from the first acquisition unit, and a storage unit storing the second definition information acquired by the second acquisition unit in a storage area for each of the peripheral apparatuses used by the device driver.

Further features of the present disclosure will become apparent from the following description of exemplary embodiments with reference to the attached drawings.

BRIEF DESCRIPTION OF THE DRAWINGS

FIG. 5A is a diagram illustrating an example of a print setting screen of a vendor-specific printing extension application.

FIG. 5B is a diagram illustrating an example of a print setting screen of a vendor-specific printing extension application.

FIG. 7 is a diagram illustrating an example of a definition for apparatus-common (apparatus-independent) information acquisition.

FIG. 8 is a diagram illustrating an example of an extended definition for information acquisition with a USB.

FIG. 9 is a diagram illustrating an example of a definition for apparatus-specific (apparatus-dependent) information acquisition.

FIG. 11 is a flow chart illustrating an example of a process of acquiring a definition for apparatus-specific information acquisition in a second embodiment.

DESCRIPTION OF THE EMBODIMENTS

Embodiments of the present disclosure will now be described in detail in accordance with the accompanying drawings.

First Embodiment

Figure 1:
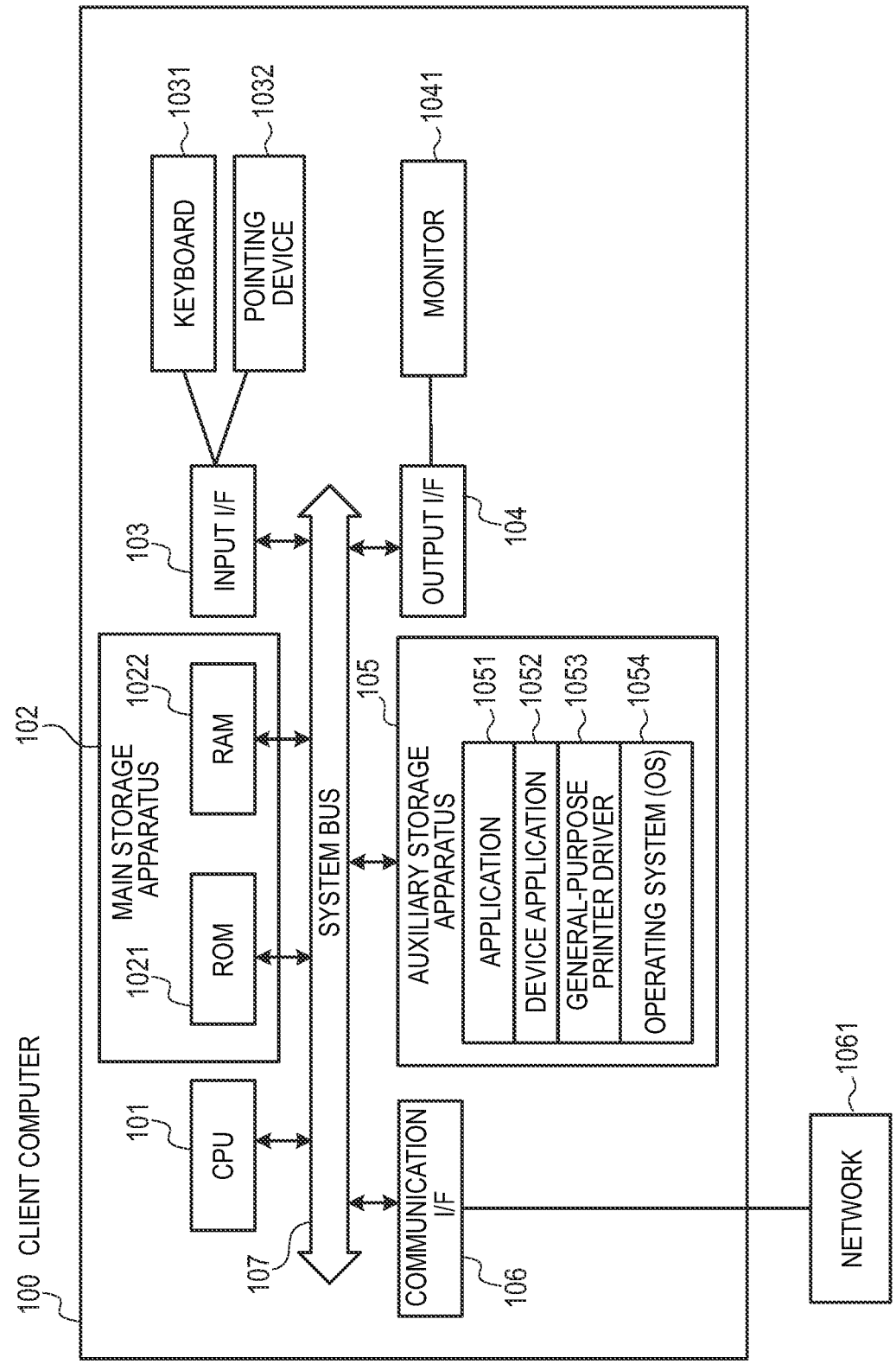
FIG. 1 is a diagram illustrating an example of a configuration of an information processing apparatus of the present embodiment.

FIG. 1 is a diagram illustrating an example of a configuration of an information processing apparatus according to an embodiment of the present disclosure.

In FIG. 1, a client computer 100 is an information processing apparatus of the present embodiment including a general computer.

A CPU 101 controls a computer 100 as a whole according to a program stored in a ROM 1021 or a RAM 1022 in a main storage apparatus 102 or in an auxiliary storage apparatus 105.

The RAM 1022 is also used as a work area for execution of processes by a CPU 101.

The auxiliary storage apparatus 105 stores various programs such as an application 1051 and a device application 1052, a general-purpose printer driver 1053, and an operating system (OS) 1054. The printer driver is an example of a device driver. The present disclosure is applicable to device drivers and is not limited to printer drivers. Examples of the device driver include device drivers for various peripheral apparatuses (peripheral equipment) such as a scanner driver and a facsimile driver.

Input apparatuses such as a keyboard 1031 and a pointing device 1032 typified by a mouse, a touch panel, or a touchpad are connected to the computer 100 through an input interface (I/F) 103. The computer 100 accepts operations on the programs from the user through these input apparatuses.

An output I/F 104 connects to an output device such as a monitor 1041 to display a UI on the monitor according to program instructions. Some terminals including smartphones and tablet terminals include the pointing device 1032 and the monitor 1041 integrated together. However, the pointing device 1032 and the monitor 1041 are separately represented here according to roles of these units. In the description below, the pointing device 1032 and the monitor 1041 may of course be replaced with each other.

Figure 2:
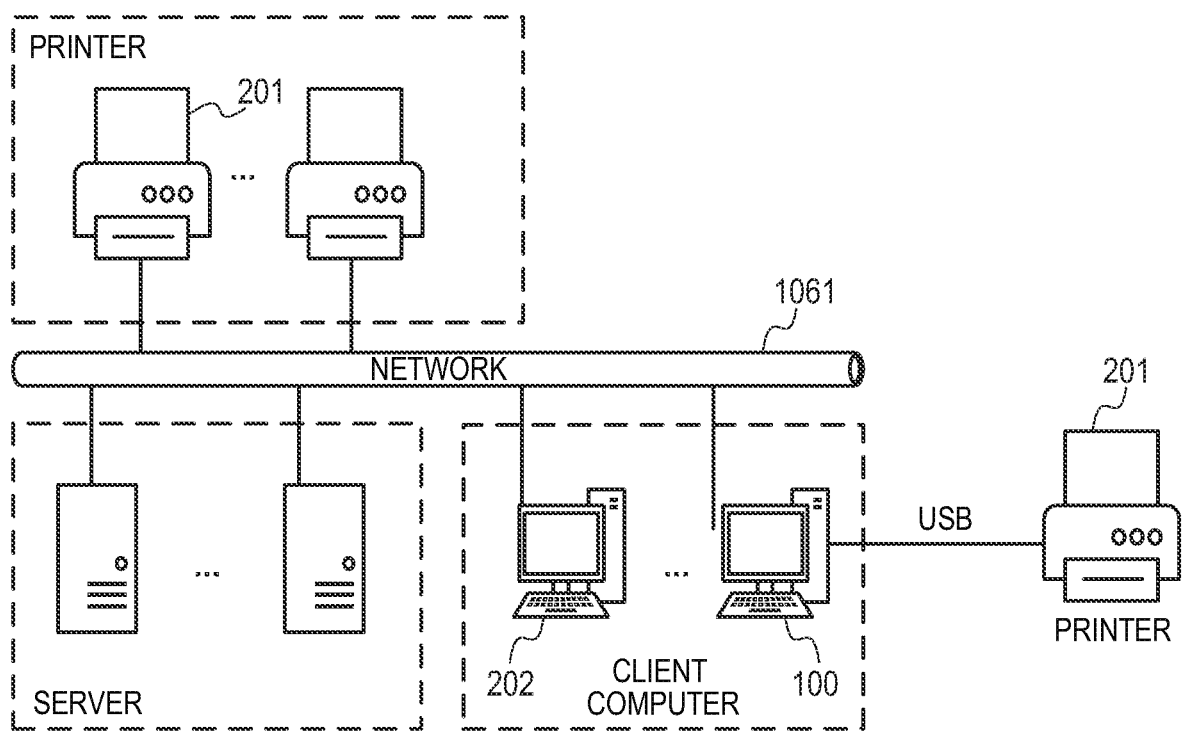
FIG. 2 is a diagram illustrating an example of a configuration of a system including the information processing apparatus of the present embodiment.

The communication I/F 106 is connected to a network 1061 and a Universal Serial Bus (USB) 1062 and can communicate with external apparatuses of the computer 100, for example, a computer 202 and a printer 201 in FIG. 2.

The above-described modules are connected together by a system bus 107 and can transmit and receive data among the modules. Programs (1051-1054 etc.) for implementing functions of embodiments of the present invention can be added to the auxiliary storage apparatus 105 via a CD-ROM, a USB memory, or the like which is unillustrated. Furthermore, these programs can be added to the auxiliary storage apparatus 105 via the network 1061. Unless otherwise noted, the present disclosure is of course applicable regardless of the configuration of the apparatus given the functions of the present disclosure are executed. The system may include a single apparatus or a plurality of apparatuses and the apparatuses may be connected together via a local network for processing.

An environment of the network 1061 will be described below using FIG. 2.

FIG. 2 is a diagram illustrating an example of a configuration of a system including the information processing system of the present embodiment.

The system of the present embodiment includes one or more printing apparatuses (also referred to as image forming apparatuses) such as a computer 100/202 to create documents or images to be printed connected to the network. Furthermore, one or more printers 201 may be connected to the network or to the computer 100/202 via the USB 1062. An example of a peripheral apparatus is an image forming apparatus. An example of the image forming apparatus may be the printer 201, a scanner, a facsimile machine, or a multi-function printer including a scanner and a facsimile machine.

The network includes small- to large-scale networks such as a Personal Area Network (PAN) and a LAN, and these apparatuses are connected to all of the networks. A server such as a cloud and a printer may be connected to the system via the Internet. A communication scheme in this case includes, but not limited to, Bluetooth® communication and communication using cellular phone line in compliance with the IMT-2000 standards, as well as wireless LAN communication compliant with the IEEE 802.11 standards. The IMT-2000 represents "International Mobile Telecommunication 2000". Furthermore, in regard to the USB, relaying with a USB hub or an exchange may be used instead of direct connection.

Figure 3:
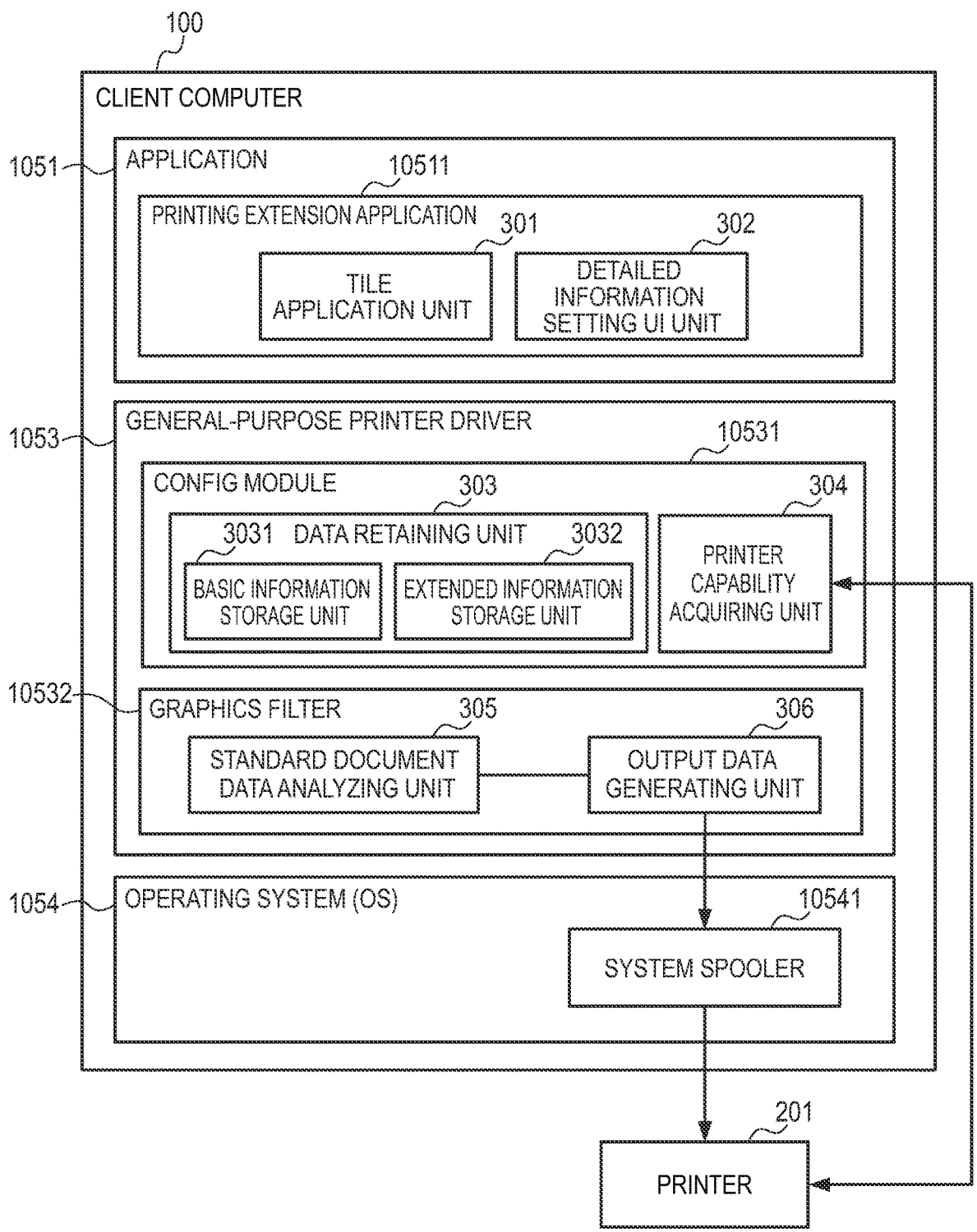
FIG. 3 is a diagram illustrating an example of a software configuration of a client computer.

FIG. 3 is a diagram illustrating an example of a software configuration of a client computer 100. In the present embodiment, the application 1051 and the general-purpose printer driver 1053 will be described in detail. In particular, the following will be described in detail: a printing extension application 10511 included in the application 1051, a config module 10531 that is a component of the general-purpose printer driver 1053, and a graphics filter 10532. Software modules illustrated in FIG. 3 are implemented to function by the CPU 101 by loading, into the RAM 1022, a program stored in the auxiliary storage apparatus 105 and the like and executing the program.

The application 1051 is a general application such as a word processor or a browser. The application 1051 displays the UI on the monitor 1041 and receives a user's print request via the input apparatus such as the pointing device 1032 or the keyboard 1031. The application 1051 having received the user's print request issues a print request to a printing system (not illustrated) that is a subsystem of the OS 1054. The printing system is positioned between the application 1051 and the general-purpose printer driver 1053 to execute processes common to a printing process. Specific processes executed include selection of a printing target printer and conversion, using the general-purpose printer driver 1053 selected, into a print instruction interpretable by the printer 201.

The printing extension application 10511 includes a tile application unit 301 and a detailed information setting UI unit 302.

The tile application unit 301 is a UI unit executed in response to a user operation activating the printing extension application 10511. The tile application unit 301 displays a list of registered printers as illustrated in FIG. 6 and provides functions such as display of a printer status.

Figure 6:
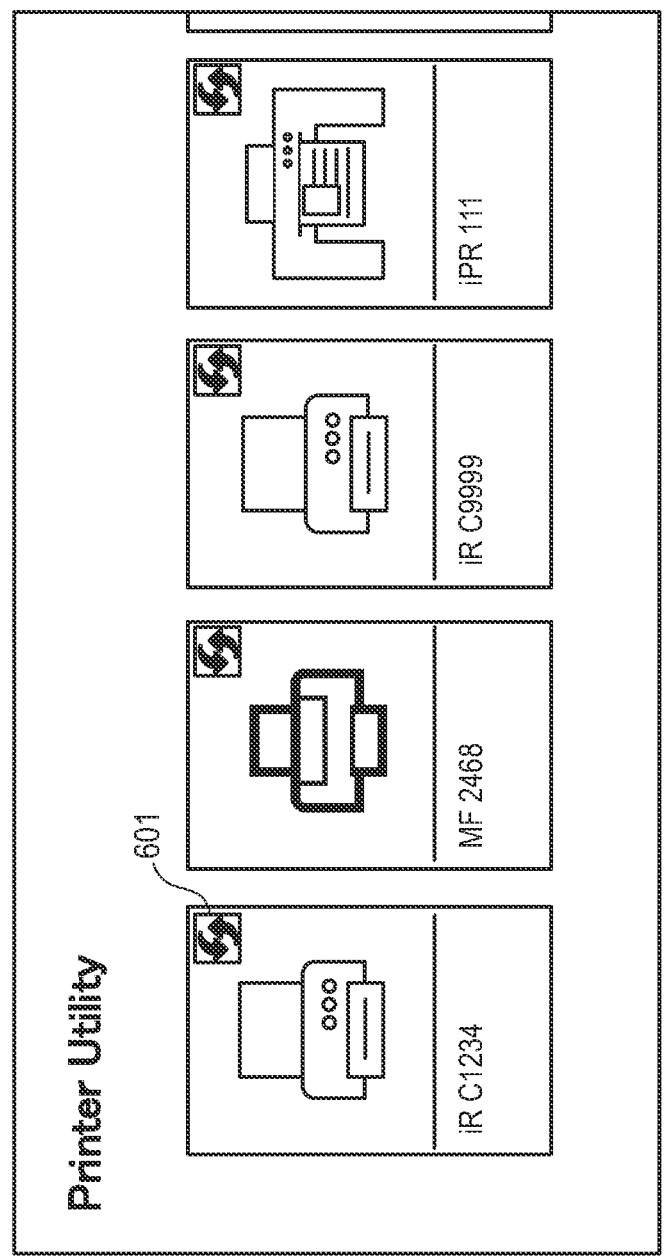
FIG. 6 is a diagram illustrating a screen of a vendor-specific tile application.

FIG. 6 is a diagram illustrating a screen of a vendor-specific tile application.

An information acquisition button 601 illustrated in FIG. 6 is used to acquire the status of a printer.

The detailed information setting UI unit 302 is a UI unit executed by receiving a detailed print setting event performed by the OS 1054. Specifically, by clicking a link 401 to a detailed setting screen present in a print setting screen illustrated in FIG. 4 and provided as an OS standard, the detailed information setting UI unit 302 is caused to display the UI of the printing extension application 10511 as illustrated in FIG. 5A and FIG. 5B.

Figure 4:
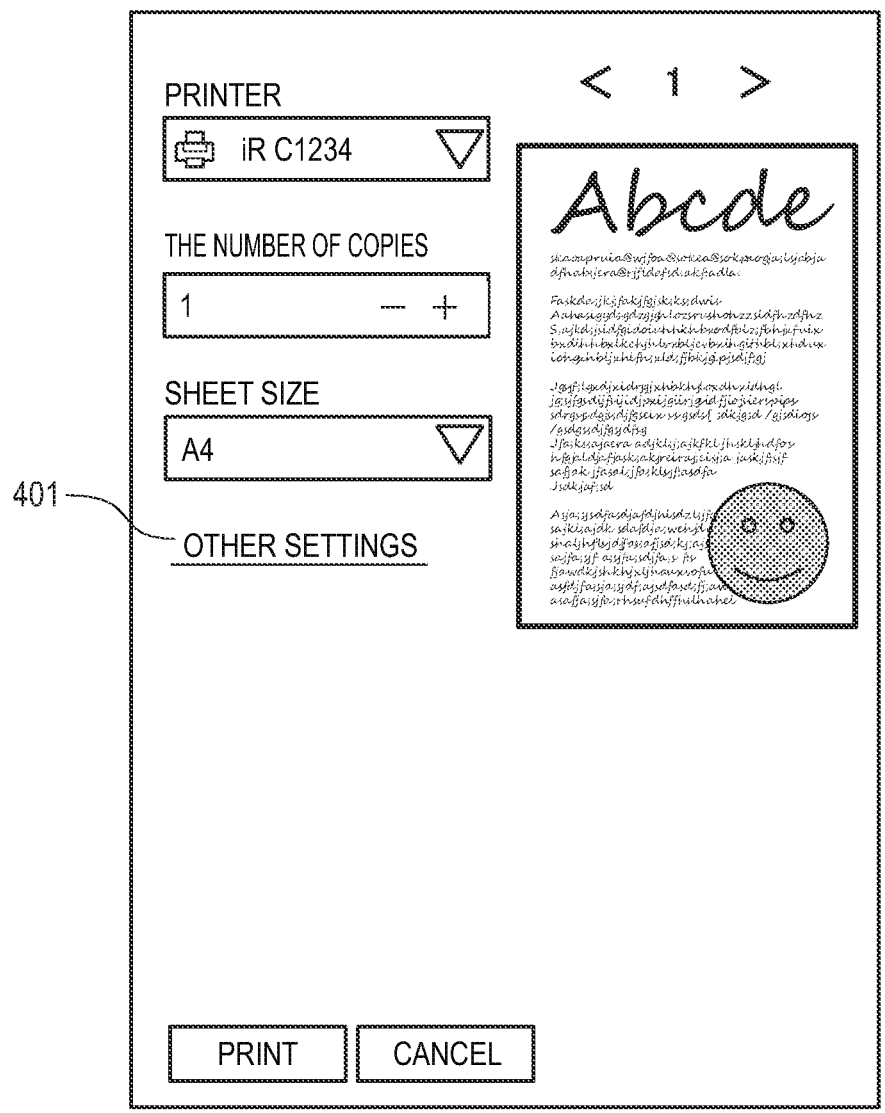
FIG. 4 is a diagram illustrating an example of an OS standard print setting screen.

FIG. 4 is a diagram illustrating an example of an OS standard print setting screen.

FIG. 5A and FIG. 5B are diagrams illustrating an example of a print setting screen of a vendor-specific printing extension application. This will be described below in detail.

A printer driver is generally a module responsible for processes dependent on a printer for which printing is to be destined. However, the general-purpose printer driver 1053 of the present embodiment complies with standards and can perform communication and printing independently of the vendor or model of the printer. The general-purpose printer driver 1053 is a printer driver which can be utilized commonly for a plurality of printers from different vendors or different models. The general-purpose printer driver 1053 include additional functions and detailed setting screens that can be extended by installation of the printing extension application 10511.

The config module 10531 includes a data retaining unit 303 and a printer capability acquiring unit 304.

The data retaining unit 303 corresponds to a storage area storing data used in the general-purpose printer driver 1053. Here, the data retaining unit 303 corresponds not only to a file system or a registry present on the auxiliary storage apparatus 105 but also to volatile data temporarily stored in the RAM 1022.

The data retaining unit 303 includes a basic information storage unit 3031 and an extended information storage unit 3032.

The basic information storage unit 3031 is an area where the following is stored: information, definitions and the like related to settings and specifications defined before the general-purpose printer driver 1053 is installed and common or commonly used in the vendor. Specifically, the stored information, definitions and the like include definitions related to capabilities necessary to print and print setting such as a corresponding sheet size and a color setting, definitions related to prohibitions, for example, "an A3 size does not allow for stapling", and definitions related to information acquired during communication (definitions for information acquisition common to apparatuses). The basic information storage unit 3031 may also store conversion tables for data for avoiding dependency common to printers of each vendor, and definitions for conversion logic. Thus, the basic information storage unit 3031 stores information commonly usable for a plurality of printers from different vendors or different models.

On the other hand, the extended information storage unit 3032 stores data defined in order to extend the functions after the general-purpose printer driver 1053 is installed. The data corresponds to, for example, support information about special sheets, definitions related to apparatus-specific functions such as definitions related to functions using apparatus-specific finishers, and information used to control settings after installation such as customization of default values and setting of favorites. Furthermore, the data may be information other than print settings, that is, information for internal use such as image quality correction including calibration.

Thus, the basic information storage unit 3031 stores information that can be utilized commonly for a plurality of printing apparatuses from different vendors or different models (for example, definition information for information acquisition common to apparatuses). Furthermore, the extended information storage unit 3032 stores apparatus-specific information (for example, definition information for apparatus-specific information acquisition). The data retaining unit 303 is provided for each printer.

The printer capability acquiring unit 304 acquires apparatus configuration information, user set information, and the like from the printer 201. Communication used for the acquisition uses any of standard protocols including Internet Printing Protocol (IPP) and Web Service on Devices (WSD) and refers to communication that can be executed by the OS 1054.

Applications including the printing extension application 10511 is assumed to be allowed to independently invoke processing of the printer capability acquiring unit 304. In the description below, the IPP is used by way of example. The printer capability acquiring unit 304 acquires the capability information stored in the basic information storage unit 3031 using a printer attribute request operation (Get-Printer-Attributes Operation) designated as "RFC2911". The printer capability acquiring unit 304 also transmits a Get-Printer-Attributes Request to the printer 201. As a response to the request, attribute information for the printer 201 is obtained. The printer capability information obtained by the printer attribute request operation includes capability information for standard print settings, for example, "double side" and "color printing".

The graphics filter 10532 receives from the application 1051, via the printing system, standard document data including setting information generally interpretable by printers, and a standard document data analyzing unit 305 analyzes the standard document data. The graphics filter 10532 uses an output data generating unit 306 to convert the standard document data such that the resultant data reflects the print settings. The converted standard document data is delivered to a system spooler 10541 that is a subsystem of the OS 1054, which then transmits the data to the printer 201.

The standard document data as used herein refers to standard Page Description Language (PDL) such as XPS, PDF, or Post Script (PS), or PDL extended by addition of additional data. XPS refers to an "XML Paper Specification". PDF refers to a "Portable Document Format".

In the following, processing of the present embodiment will be described in brief.

In the present embodiment, configuration information is acquired from the printer 201. However, the general-purpose printer driver 1053 is independent of the vendor or model. Thus, conventional methods fail to acquire information dependent on the model including model-specific functions. For example, a "staple" capability is common, and can thus be can be defined as information common among vendors and models so as to be acquirable by a standard configuration information acquiring process. However, the capability of "needle-less binding" function to perform binding using no metal needle belongs only to particular models, and thus, the information fails to be acquired by the standard configuration information acquiring process. Thus, in the present embodiment, first, an inquiry for a definition for acquisition of model-specific information is made to the printer 201 using a definition for acquisition of model common information (the definition can be utilized commonly for a plurality of printers from different vendors or different models). Then, the acquired definition for acquisition of model-specific (model-dependent) information is used to acquire model-specific capability information from the printer 201.

The above-described processing will be described using a flow in FIG. 10.

Figure 10:
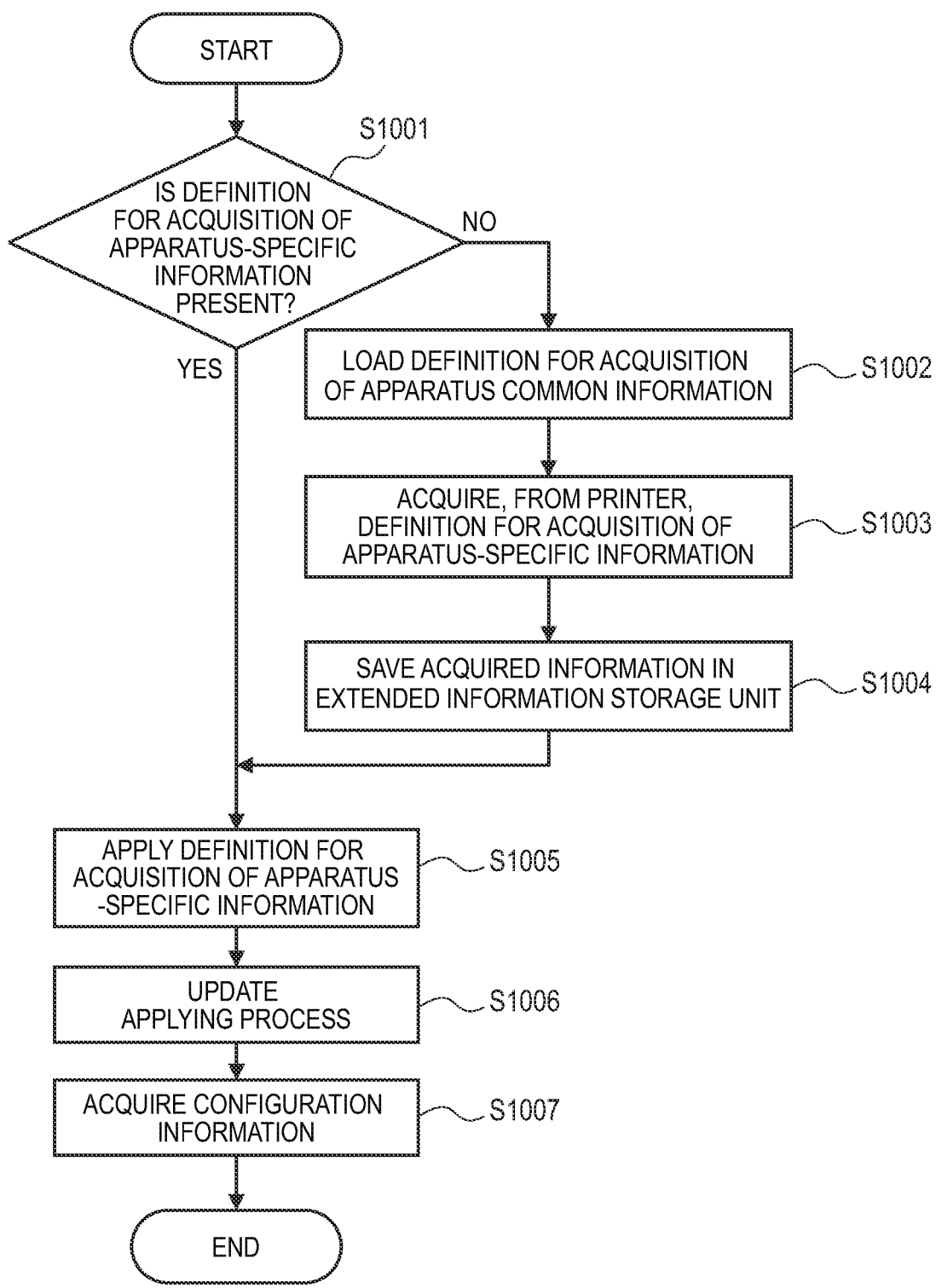
FIG. 10 is a flowchart illustrating an example of a configuration information acquiring process in a first embodiment.

FIG. 10 is a flowchart illustrating an example of a configuration information acquiring process in the first embodiment. In the present embodiment, in a case where configuration information is acquired, model-dependent definitions are acquired from a printer and the model-dependent definitions are used to acquire model-specific information from the printer. The process in the flowchart is implemented by the CPU 101 of the client computer 100 by loading, into the RAM 1022, the program stored in the auxiliary storage apparatus 105 or the like and executing the program. The process illustrated in the present flowchart is assumed to be executed in the printer capability acquiring unit 304 of the general-purpose printer driver 1053 invoked by the OS 1054 unless otherwise noted. Here, the printer 201 will be described by way of example.

Furthermore, timings at which the process illustrated in the present flowchart is executed are properly invoked by events generated from the OS 1054, events generated from the printer 201, and events generated by a user operation. First, the events generated from the OS 1054 refer to, for example, an event generated at a timing when the general-purpose printer driver 1053 is installed and initialized, and an event generated when the OS 1054 is connected to the network or a connection state is changed. The event may also be generated at given time intervals scheduled by the system or at particular points in time. Furthermore, the events generated from the printer 201 refer to, for example, events generated when the printer 201 updates the settings or is activated and when an option such as a finisher is attached to (removed from) the printer. The events generated from the printer 201 also include an event generated, for example, when the status of the printer 201 is updated. Furthermore, the events generated by the user operation are generated when the printing extension application 10511 linked to the general-purpose printer driver 1053 is operated. For example, the events generated by the user operation correspond to operations of the information acquisition button 601 of the tile application unit 301 and the information acquisition button 501 of the detailed information setting UI unit 302. Furthermore, activation and termination of the printing extension application 10511 by the user are also considered as events generated by the user operation.

First, in S1001, the printer capability acquiring unit 304 determines whether a definition for acquisition of model-specific information is present. Specifically, the printer capability acquiring unit 304 determines whether any definition for acquisition of model-specific information is present in the extended information storage unit 3032 of the data retaining unit 303 corresponding to the printer 201. At this time, a determination condition may be that information similar to a definition for acquisition of model-specific information has been loaded onto the RAM 1022 of the system or that a flag is set indicating that a definition for acquisition of model-specific information has been acquired.

In a case of determining in S1001 that no definition for acquisition of model-specific information is present (No in S1001), the printer capability acquiring unit 304 advances the process to S1002 and controls the printer 201 to acquire a definition for acquisition of model-specific information.

In S1002, the printer capability acquiring unit 304 loads the definition for acquisition of apparatus-common information. As described above, the definition for acquisition of apparatus-common information is saved in the basic information storage unit 3031 of the data retaining unit 303 corresponding to the printer 201 as data independent of the model. The definition is, for example, as illustrated in FIG. 7.

FIG. 7 is a diagram illustrating an example of a definition for acquisition of apparatus-common (apparatus-independent) information.

A definition 701 for acquisition of capability information is request information for acquiring, from the printer 201, a definition for acquisition of model-specific information. Making this request enables acquisition, from the printer 201, of a definition for acquisition of apparatus-specific information as illustrated in FIG. 9. The request of the present embodiment assumes acquisition of a definition in the form of a character string. However, data may otherwise be acquired in a binary format or in another data format such as JSON instead of XML as in the present example, which is then converted for use.

FIG. 9 is a diagram illustrating an example of a definition for acquisition of apparatus-specific (apparatus-dependent) information.

Then, in S1003, the printer capability acquiring unit 304 acquires, from the printer 201, a definition for acquisition of apparatus-specific (apparatus-dependent) information based on the information loaded in S1002 (definition for acquisition of apparatus-common (apparatus-independent) information). The information acquired is loaded into the RAM 1022 of the system. At this time, the OS 1054 controls processes such as establishment of connection and retransmission process during data acquisition. Furthermore, a process for USB connection conditions is basically similar to the process for network connection conditions. However, in a case where data used for communication by the printer 201 is specific to a vendor or needs special processing, an executable script as illustrated in FIG. 8 may be loaded to allow an appropriate process to be executed. The present script is loaded to allow the printer 201 to execute a printing process or to allow information to be acquired. The script allows execution of a function with a name specified according to the contents of the process.

FIG. 8 is a diagram illustrating an example of an extended definition for information acquisition with the USB.

For example, when information is acquired, a getSchemas function of FIG. 8 is invoked to invoke a process described in the function. In the present example, the getSchemas function is invoked, but for example, in a case of IPP connection, a process linked to a GetPrinterAttribute function is invoked. Furthermore, in this process, for example, when data returned from the printer is vendor-specific binary data or data in a predetermined format, the data is converted. The following process may also be executed: waiting for a process of the printer 201 to end during communication or during branching of a process on an apparatus-by-apparatus basis such as switching of the conversion process on an apparatus-by-apparatus basis, or matching of communication data in a case where information acquisition and a printing process run in parallel. Data conversion using this script enables a process to be executed as is the case with normal communication in the network.

Then, in S1004, the printer capability acquiring unit 304 saves the data acquired in S1003 (definition for acquisition of apparatus-specific information) to the extended information storage unit 3032 of the data retaining unit 303 corresponding to the printer 201. The printer capability acquiring unit 304 advances the process to S1005.

Furthermore, in a case of determining, in S1001, that any definition for acquisition of model-specific information is present (Yes in S1001), the printer capability acquiring unit 304 advances the process to S1005.

In S1005, the printer capability acquiring unit 304 executes a process of applying the definition for acquisition of apparatus-specific information. Here, the process is assumed to include replacing an apparatus-common definition as illustrated in FIG. 7 with a definition as illustrated in FIG. 9. However, in a case where the apparatus-common definition does not conflict with the apparatus-specific definition, both definitions may be loaded or the two files may be merged.

Then, in S1006, the printer capability acquiring unit 304 executes a process of applying the information updated by the process in S1005. The present process corresponds to reloading of a setting or invocation of a process to be applied but may be invocation of a system initialization process. Furthermore, the system spooler 10541, managed by the OS 1054, is reactivated as needed. During reactivation, the process of the printer capability acquiring unit 304 may be re-executed as needed using a task scheduler or an external process.

Then, in S1007, the printer capability acquiring unit 304 acquires, from the printer 201, apparatus-specific (apparatus-dependent) information based on the definition for acquisition of apparatus-specific information applied in S1006. In the present example, information is acquired using a definition for acquisition of apparatus-specific information as illustrated in FIG. 9. For example, an apparatus-common definition 901 is a definition for acquisition of information on an apparatus-common setting of whether stapling is enabled. Furthermore, an apparatus-specific definition 902 is a definition for acquisition of apparatus-specific information such as "punching or needle-less binding". In the present step, information is acquired according to such a definition. The printer capability acquiring unit 304 saves the configuration information thus acquired in the extended information storage unit 3032 of the data retaining unit 303 corresponding to the printer 201, to end the process in the present flowchart.

Now, an example of a setting screen displayed based on the information acquired will be described using FIG. 5A and FIG. 5B. FIG. 5A illustrates an example of a setting screen displayed in a case where no apparatus-specific information has been acquired. Furthermore, FIG. 5B illustrates an example of a setting screen displayed in a case where apparatus-specific information has been acquired.

The screens in FIG. 5A and FIG. 5B are displayed in response to the OS 1054 detecting a user operation for print setting and then invoking the printing extension application 10511 corresponding to the printer to be used for printing. The printing extension application 10511 activated by the OS 1054 acquires function information stored in the data retaining unit 303 of the general-purpose printer driver 1053 and corresponding to the printer to be used for printing. The detailed information setting UI unit 302 of the printing extension application 10511 displays a setting screen as illustrated in FIG. 5A or FIG. 5B based on the information acquired.

For example, in response to the user operating the information acquisition button 501 on the setting screen in FIG. 5A, the process in FIG. 10 described above is executed. Then, in a case where an event is received from the OS 1054, the detailed information setting UI unit 302 updates display of the detailed setting screen using the apparatus-specific (apparatus-dependent) configuration information acquired by the process in FIG. 10. This enables the setting screen before apparatus information acquisition as illustrated in FIG. 5A to be switched to the setting screen as illustrated in FIG. 5B also including apparatus-specific settings. The general-purpose printer driver 1053 then uses the print settings provided in the setting screen as illustrated in FIG. 5B to control the printer 201. For example, the general-purpose printer driver 1053 transmits a print job or the like to the printer 201 based on the print settings provided on the setting screen provided on the setting screen as illustrated in FIG. 5B.

As described above, the general-purpose printer driver can perform acquisition of information regarding apparatus-specific functions, the acquisition failing to be enabled by the formulated standards.

Second Embodiment

In a case described in a second embodiment, a definition for acquisition of apparatus-specific information is present on the server. In the configuration described in the first embodiment, an inquiry for a definition for acquisition of apparatus-specific information is made to the printer. However, a configuration described in the second embodiment acquires a definition from the server.

FIG. 11 is a flowchart illustrating an example of a process of acquiring a definition for acquisition of apparatus-specific information in the second embodiment. The process is executed in place of S1002 and S1003 in FIG. 10.

The process in the flowchart is implemented by the CPU 101 of the client computer 100 by loading, into the RAM 1022, a program stored in the auxiliary storage apparatus 105 or the like and executing the program. The process illustrated in the present flowchart is assumed to be executed in the printer capability acquiring unit 304 of the general-purpose printer driver 1053 invoked by the OS 1054 unless otherwise noted.

In S1101, the printer capability acquiring unit 304 acquires a location where a definition for acquisition of apparatus-specific information is stored. Information about the storage location may be predefined on the general-purpose printer driver 1053 or may be a file reference described on the apparatus-common definition. In a case where the storage location varies depending on the vendor or the model, the storage location may be acquired using information about the vendor, model, or the like of the printer 201. Furthermore, in regard to the storage location, a file for the definition for acquisition of apparatus-specific information located on the Internet, uploaded as a shared file onto the server, or located in a local storage may be used. Furthermore, a file sharing mechanism provided on the printer 201 may be used to store the file.

Then, in S1102, the printer capability acquiring unit 304 executes an authentication process on the storage location for the definition for acquisition of apparatus-specific information, the storage location having been acquired in S1101.

Then, in S1103, the printer capability acquiring unit 304 acquires the file for the definition for acquisition of apparatus-specific information from the storage location for the definition for acquisition of apparatus-specific information, the storage location having been acquired in S1101. The definition is acquired using information about the vendor, model, or the like of the printer 201 as needed while acquiring.

Execution of the above-described process allows acquisition of the file for the definition for acquisition of apparatus-specific information located in the server or the like.

As illustrated above, according to each embodiment, information regarding the model-specific function of the printing apparatus can be acquired from the general-purpose printer driver commonly usable for various types of printers and independent of the vendor or the model; this acquisition fails to be enabled by the formulated standards.

The configurations and contents of the various data described above are not limited to the above description and may be varied according to applications and purposes.

Embodiments have been described. However, embodiments of the present disclosure can take a form of, for example, a system, an apparatus, a method, a program, or a storage medium. Specifically, the present disclosure may be applied to a system including a plurality of apparatuses or to a single apparatus.

Furthermore, the present disclosure includes all configurations corresponding to combinations of the above-described embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, the present disclosure may be applied to a system including a plurality of apparatuses or to a single apparatus.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

According to embodiments of the present disclosure, the general-purpose device driver can be used to perform acquisition of information regarding model-specific functions of a peripheral apparatus, the acquisition failing to be enabled by the formulated standards. According to embodiments of the present disclosure, a mechanism can be provided that can reduce device-dependent portions of system software.

What is claimed is:

1. A control method for controlling an information processing apparatus having printing software and a print setting application, the control method comprising:
receiving, according to the Internet Printing Protocol, first information regarding a first setting value which is able to be set via a first screen provided by the printing software, the printing software being able to transmit a print data, printable by a plurality of printers provided by a plurality of vendors, to the plurality of printers;
receiving, according to the Internet Printing Protocol, second information regarding a second setting value which is not able to be set via the first screen, the first information and the second information being received from a printing apparatus, and the first information and the second information being capability information regarding the printing apparatus; and
after a user operation via the first screen, causing a display of the information processing apparatus to display a second screen provided by the print setting application, the second setting value being able to be set via the second screen.

2. The control method according to claim 1, wherein the first information and the second information are received using a Get-Printer-Attributes operation.

3. The control method according to claim 1, wherein the first setting value is a setting value regarding a color setting, and the second setting value is a setting value for binding sheets without a staple.

4. The control method according to claim 1, wherein the control method is to be performed by executing the print setting application.

5. The control method according to claim 1, wherein the user operation via the first screen is to click a link to the second screen.

6. The control method according to claim 1, wherein the second information is obtained using definition information indicating the second setting value.

7. The control method according to claim 6, further comprising obtaining the definition information based on another definition information indicating the first setting value.

8. The control method according to claim 1, further comprising outputting a set of setting values including the first setting value or the second setting value, the set of setting values set via the second screen.

9. The control method according to claim 1, wherein the second information is obtained after an information acquisition button is operated.

10. The control method according to claim 1, wherein the second information is obtained after the user operation via the first screen is executed.

11. The control method according to claim 1, wherein the print data is Portable Document Format data.

12. A non-transitory computer-readable storage medium storing a print setting application that causes an information processing apparatus having printing software to perform a control method comprising:
receiving, according to the Internet Printing Protocol, first information regarding a first setting value which is able to be set via a first screen provided by the printing software, the printing software being able to transmit a print data, printable by a plurality of printers provided by a plurality of vendors, to the plurality of printers;
receiving, according to the Internet Printing Protocol, second information regarding a second setting value which is not able to be set via the first screen, the first information and the second information being received from a printing apparatus, and the first information and the second information being capability information regarding the printing apparatus; and
after a user operation via the first screen, causing a display of the information processing apparatus to display a second screen provided by the print setting application, the second setting value being able to be set via the second screen.

13. The non-transitory computer-readable storage medium according to claim 12, wherein the first information and the second information are received using a Get-Printer-Attributes operation.

14. The non-transitory computer-readable storage medium according to claim 12, wherein the first setting value is a setting value regarding a color setting, and the second setting value is a setting value for binding sheets without a staple.

15. The non-transitory computer-readable storage medium according to claim 12, wherein the user operation via the first screen is to click a link to the second screen.

16. The non-transitory computer-readable storage medium according to claim 12, wherein the second information is obtained using definition information indicating the second setting value.

17. The non-transitory computer-readable storage medium according to claim 16, wherein the control method further comprises obtaining the definition information based on another definition information indicating the first setting value.

18. The non-transitory computer-readable storage medium according to claim 12, wherein the control method further comprises outputting a set of setting values including the first setting value or the second setting value, the set of setting values set via the second screen.

19. The non-transitory computer-readable storage medium according to claim 12, wherein the second information is obtained after an information acquisition button is operated.

20. The non-transitory computer-readable storage medium according to claim 12, wherein the second information is obtained after the user operation via the first screen is executed.

21. The non-transitory computer-readable storage medium according to claim 12, wherein the print data is Portable Document Format data.

22. An information processing apparatus comprising:
at least one memory storing printing software and a print setting application; and
one or more processors configured to:
receive, according to the Internet Printing Protocol, first information regarding a first setting value which is able to be set via a first screen provided by the printing software, the printing software being able to transmit a print data, printable by a plurality of printers provided by a plurality of vendors, to the plurality of printers;
receive, according to the Internet Printing Protocol, second information regarding a second setting value which is not able to be set via the first screen, the first information and the second information being received from a printing apparatus, and the first information and the second information being capability information regarding the printing apparatus; and
after a user operation via the first screen, cause a display of the information processing apparatus to display a second screen provided by the print setting application, the second setting value being able to be set via the second screen.

23. The information processing apparatus according to claim 22, wherein the second information is obtained using definition information indicating the second setting value.

24. The information processing apparatus according to claim 23, wherein the one or more processors is further configured to obtain the definition information based on another definition information indicating the first setting value.

* * * * *